(12) United States Patent
Nogami

(10) Patent No.: US 8,649,277 B2
(45) Date of Patent: Feb. 11, 2014

(54) COMMUNICATION APPARATUS AND METHOD

(75) Inventor: Kousuke Nogami, Tokyo (JP)

(73) Assignee: NEC Corporation, Tokyo (JP)

( * ) Notice: Subject to any disclaimer, the term of this patent is extended or adjusted under 35 U.S.C. 154(b) by 638 days.

(21) Appl. No.: 12/306,497

(22) PCT Filed: Jun. 1, 2007

(86) PCT No.: PCT/JP2007/061166
§ 371 (c)(1),
(2), (4) Date: Dec. 23, 2008

(87) PCT Pub. No.: WO2008/001580
PCT Pub. Date: Jan. 3, 2008

(65) Prior Publication Data
US 2009/0310498 A1    Dec. 17, 2009

(30) Foreign Application Priority Data
Jun. 29, 2006  (JP) .................... 2006-178965

(51) Int. Cl.
    *H04J 1/16*    (2006.01)
(52) U.S. Cl.
    USPC ........................................... 370/252
(58) Field of Classification Search
    USPC .................................. 370/252, 328
    See application file for complete search history.

(56) References Cited

U.S. PATENT DOCUMENTS

| | | | | |
|---|---|---|---|---|
| 5,999,570 | A * | 12/1999 | Chaki | 375/281 |
| 7,139,281 | B1 * | 11/2006 | Bodin | 370/412 |
| 7,167,451 | B1 * | 1/2007 | Oran | 370/252 |
| 7,451,382 | B2 * | 11/2008 | Kim et al. | 714/779 |
| 7,570,589 | B1 * | 8/2009 | Apostolopoulos et al. | 370/235 |
| 2002/0176482 | A1 * | 11/2002 | Chien | 375/132 |
| 2003/0152096 | A1 * | 8/2003 | Chapman | 370/412 |
| 2004/0064577 | A1 * | 4/2004 | Dahlin et al. | 709/235 |
| 2004/0160955 | A1 * | 8/2004 | Hanaki et al. | 370/390 |
| 2005/0251725 | A1 * | 11/2005 | Huang et al. | 714/752 |

FOREIGN PATENT DOCUMENTS

| | | |
|---|---|---|
| JP | 5-183539 A | 7/1993 |
| JP | 6-350575 A | 12/1994 |
| JP | 9-298526 A | 11/1997 |
| JP | 2002-101072 A | 4/2002 |

(Continued)

OTHER PUBLICATIONS

Yi J. Liang et al., "Model-Based Delay-Distortion Optimization for Video Streaming Using Packet Interleaving" Conference Record of the Thirty-Sixth Asilomar Conference on Signals, Systems and Computers, 2002, pp. 1315-1319, vol. 2. IEEE.

(Continued)

*Primary Examiner* — Mark Rinehart
*Assistant Examiner* — Mohammad Anwar
(74) *Attorney, Agent, or Firm* — Sughrue Mion, PLLC

(57) ABSTRACT

A packetizer sectionalizes data to be transmitted into predetermined units and packetizes them into packets. A permuter permutes the order of the packets created by the packetizer based on a designated interleave length and sends out the packets to a network. A continuous loss information collector collects information on continuous packet loss occurring on the network. An interleave length determiner determines an interleave length based on the information on continuous packet loss, collected by the continuous loss information collector and designates the interleave length for the permuter.

7 Claims, 6 Drawing Sheets

(56) References Cited

FOREIGN PATENT DOCUMENTS

| | | |
|---|---|---|
| JP | 2002-124991 A | 4/2002 |
| JP | 2003-309663 A | 10/2003 |
| JP | 2004-032283 A | 1/2004 |
| JP | 2005-159536 A | 6/2005 |
| JP | 2005-233993 A | 9/2005 |
| JP | 2006-101024 A | 4/2006 |

OTHER PUBLICATIONS

Sum Kim Chin et al., "Improving Video Quality Using Packet Interleaving, Randomisation and Redundancy" IEEE Conference on Local Computer Networks, 2001, pp. 405-413, IEEE.

Yi J. Liang et al., "Analysis of packet Loss for Compressed video: Does Burst-Length Matter?", IEEE International Conference on Acoustics, Speech, and Signal Processing, Apr. 2003, ICASSP2003.

* cited by examiner

Interleave Length = 4

Interleave Length = 6

US 8,649,277 B2

COMMUNICATION APPARATUS AND METHOD

TECHNICAL FIELD

The present invention relates to a communication apparatus and method which packetizes data and rearranges the packets to transmit the data.

BACKGROUND ART

There is an increase of communication applications for transmitting video data and audio data from the transmission side in the form of IP (Internet Protocol) packets and for reconstructing and reproducing the video data and audio data from the IP packets on the reception side. Examples of such applications include applications for IP phone (VoIP), TV conference, video distribution of movies and live performances and the like on the internet.

Usually, in the application that handles real-time data such as video, audio, etc., when a packet is lost, a concealment technique, that tries to recover the lost packet from among the packets that arrived before the packet was lost and from among the packets that arrived after the packet was lost, has been used. This makes it possible to conceal the effect of packet loss. This one-off packet loss that is not continuous will be called a single loss.

However, once multiple packets from the transmission side have been continuously lost due to network disorder or any other reason, it is difficult to recover the packets that have lost, from the packets having arrived before and after the loss occurred, so that there occur cases in which video and/or audio is interrupted. Such a continuous packet loss will be called a continuous loss.

In this way, in the application that sends and receives video and audio and reproduces them, continuous loss of packets gives rise to a serious problem in maintaining the quality of video and audio.

In order to avoid the influence from the continuous loss of packets, use of a technology called an interleave method whereby the order of data is rearranged has been investigated. For example, there is a technique disclosed by Yi J. Liang, J. G Apostolopoulos, and B Girod, in "Analysis of packet Loss for Compressed video: Does Burst-Length Matter?", IEEE International Conference on Acoustics, Speech, and Digital Processing, ICASSP2003, April 2003 (which will be referred to hereinbelow as document 1).

FIG. 1 shows how data is rearranged by the interleave method. State 1 in the same figure shows the stage before rearrangement. In state 1, there are, in total, 16 pieces of continuous data, A1~A4, B1~B4, C1~C4 and D1~D4. If no interleaving process is performed, these 16 pieces of data are transmitted as they are in state 1, or in the order of A1->A2->A3->A4->B1->B2-> . . . ->D3->D4. In contrast, when an interleaving process is carried out in order to enhance resistance against continuous loss, the data is arranged in the order shown in state 2, or the data is transmitted in the order of A1->B1->C1->D1->A2->B2-> . . . ->C4->D4.

Now, consider a case where data A2, B2, C2 and D2 in state 2 are continuously lost. In this case, on the reception side, data A2, B2, C2 and D2 have dropped out as shown in state 3. The hatching in the drawing shows the continuous loss of data. The data indicated by the broken line represents the lost data. On the reception side, a process of recovering the original order of data from the data that was permuted on the transmission side is executed. By this process, the data shown in state 3 is reordered into state 4. As a result, the continuously lost data A2, B2, C2 and D2 will be scattered in the time-axis direction.

On the other hand, when no interleaving process is adopted, once continuous data loss of data occurs, data B1~B4 are lost as shown in state 5. In this case, data B1~B4 have been lost continuously, so that it is difficult to make recovery, hence video and/or audio will be interrupted.

In contrast, when the interleaving process is adopted, the continuous loss can be made to look like single losses as shown in state 4. Accordingly, it is possible to reproduce the video and audio by restoring the lost data.

FIG. 2A shows the arrangement order of transmitted data after an interleaving process is performed when the interleave length is "4". FIG. 2B shows the arrangement order of transmitted data after interleaving is performed when the interleave length is "6". When the interleave length is "4", the reception side receives three pieces of data B1, C1 and D1 from the time when data A1 is received until the time when data A2, that is to be reproduced after A1, is received. Accordingly, reproduction is delayed by the amount of time required for receiving three pieces of data. When the interleave length is "6", five pieces of data are received from the time when data A1 was received until the time when data A2 is received. Accordingly, reproduction is delayed by the amount of time required for receiving five pieces of data. In the interleaving scheme, the longer the interleave length is, the more the resistance to continuous loss is enhanced, though the delay of data reproduction becomes greater.

For an application that handles real-time data such as video and audio, it is preferable that delay be short, hence it is important to select the interleave length appropriately. Concerning determination of the interleave length, document 1 and "Model-Based Delay-Distortion Optimization for Video Stream Using Packet Interleaving" IEEE 36th Asilomar Conference on Signals, Systems and Computers, November 2002 (which will be referred to hereinbelow as document 2) by Yi J. Liang, J. G Apostolopouos, and B. Girod, propose methods of calculating the interleave length based on the permissible amount of delay at the time of reproduction, which has been set up previously.

Further, Japanese Patent Application Laid-open 2004-32283 (which will be referred to hereinbelow as document 3) discloses a technology of changing the interleave length in accordance with the reception condition. In document 3, the discarded ratio of packets is calculated based on the number of packets that have been discarded through the transmission path while the transmission throughput is calculated based on the time taken from the first packet transmission to the last packet transmission and the total amount of data. Then, based on the packet discarded ratio and the transmission throughput, the payload data size and the interleave length are determined. There is also a reference in document 3 in which the interleave length is made longer when, for example the packet discarded ratio is large.

DISCLOSURE OF INVENTION

In document 1 and document 2, the interleave length is determined based on the permissible amount of delay. However, in document 1 and document 2, no consideration is given for the occurrence of continuous loss in determining the interleave length. Since the object of an interleaving scheme is to improve resistance against continuous loss, the methods of document 1 and document 2, which determine the interleave length based only on the condition required for reproduction, are insufficient. When the interleave length is determined based on the permissible amount of delay alone, it is possible to enhance resistance against continuous loss of packets to the highest degree if the interleave length is made longest within the permissible range. However, if this is done, the longest interleave length will be used even if no continuous loss of packets occurs, hence the interleave length becomes greater than needed, though the reproduction delay falls within the permissible range.

On the other hand, in document 3, the interleave length is determined based on the discarded ratio of packets. However, the problem to be considered is the continuous loss that cannot be covered by the concealment technique, hence it is insufficient to determine the interleave length based on the discarded ratio alone. For example, even if the discarded ratio is high, it is meaningless to make the interleave length longer if no continuous loss takes place.

The object of the present invention is to provide a communication apparatus and method which can suitably set up resistance against continuous loss of packets.

In order to achieve the above object, the communication apparatus of the present invention includes a packetizer, a permuter, a continuous packet loss information collector and an interleave length determiner.

The packetizer sectionalizes data to be transmitted for every predetermined unit into packets.

The permuter permutes the order of the packets created by the packetizer based on a designated interleave length and sends out the packets to a network.

The continuous loss information collector collects information on continuous packet loss occurring on the network.

The interleave length determiner determines an interleave length based on the information on continuous packet loss, collected by the continuous loss information collector and designates the interleave length for the permuter.

BEST MODE FOR CARRYING OUT THE INVENTION

The embodied modes of the present invention will be described in detail with reference to the drawings.

Figure 1:
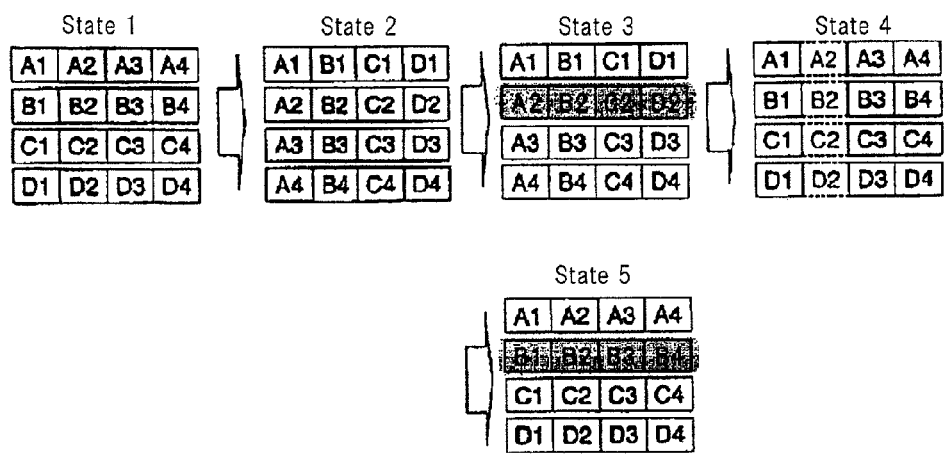
[FIG. 1] is a diagram showing how data is rearranged according to an interleave method.
Figure 2A:
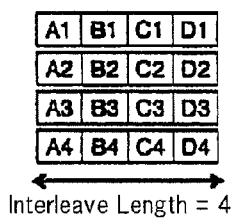
[FIG. 2A] is a diagram showing the arrangement order of transmitted data after an interleaving process is performed when the interleave length is "4".
Figure 2B:
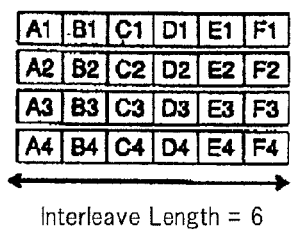
[FIG. 2B] is a diagram showing the arrangement order of transmitted data after an interleaving process is performed when the interleave length is "6".
Figure 3:
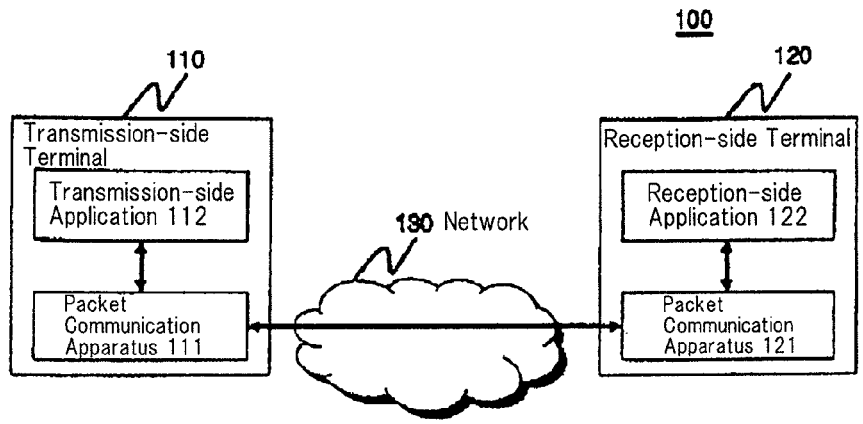
[FIG. 3] is a block diagram showing a configuration of a communication system including a packet communication apparatus of the first exemplary embodiment.

FIG. 3 shows a configuration of a communication system including a packet communication apparatus of the first exemplary embodiment of the present invention. Communication system 100 includes transmission side terminal 110 and reception side terminal 120 connected to each other via network 130. Transmission side terminal 110 and reception side terminal 120 are, for example, a personal computer. In the following description, transmission side terminal 110 on the data transmitting side and reception side terminal 120 on the data receiving side will be described by making each distinct from each other for the sake of convenience, but the roles of two terminals may be permuted from one to another, or terminal 110 and terminal 120 may mutually transmit and receive data between them.

Transmission side terminal 110 includes packet communication apparatus 111 and transmission side application 112. Transmission side application 112 is application software for transmitting, for example video and audio and creates application data such as audio data, video data and the like. Packet communication apparatus 111 subjects the application data created by transmission side application 112 to an interleaving process and outputs data to network 130. Reception side terminal 120 includes packet communication apparatus 121 and reception side application 122. Packet communication apparatus 121 performs an interleaving process of the application data received from transmission side terminal 110 via network 130 in the reverse order to that of packet communication apparatus 111 on the transmitting side. Reception side application 122 reproduces audio and video based on the received application data.

Figure 4:
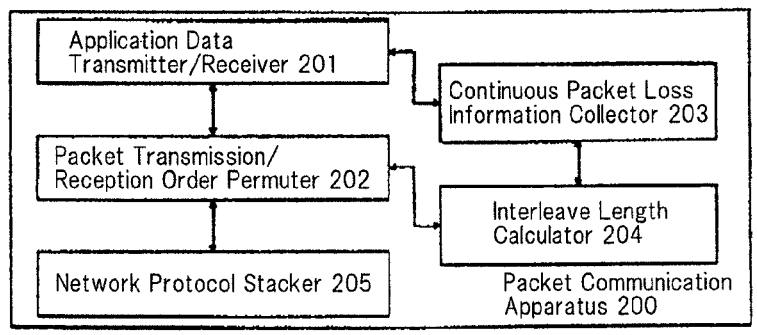
[FIG. 4] is a block diagram showing a configuration of a packet communication apparatus.

FIG. 4 shows a configuration of a packet communication apparatus. Herein, packet communication apparatuses 111 and 121 will be described as packet communication apparatus 200. Packet communication apparatus 200 includes application data transmitter/receiver 201, packet transmission/reception order permuter 202, packet continuous loss information collector 203, interleave length calculator 204 and network protocol stacker 205.

Application data transmitter/receiver 201 exchanges information as to the application such as requested reproduction quality, codec information etc., and video and audio data, with transmission side application 112 or reception side application 122 (FIG. 3), via an application program interface (API) or the like.

Network protocol stacker 205 transmits and receives the data between transmission side application 112 and reception side application 122 with the opposite side terminal via network 130.

Packet transmission/reception order permuter 202, when engaging in transmission, receives application data to be transmitted from application data transmitter/receiver 201, packetizes the received data, permutes the order of transmission of the packets by performing an interleaving process and sends the permuted packets to network protocol stacker 205.

On the other hand, packet transmission/reception order permuter 202, when engaging in reception, receives the packets whose order of transmission was permuted on the transmitting side, from network protocol stacker 205, rearranges the packets in the original order and sends the received data extracted from the packets to application data transmitter/receiver 201.

Packet continuous loss information collector 203, based on the behavior of the packets transmitted/received by transmission side application 112 or reception side application 122 (FIG. 3) or the information collected by an external network management tool, collects information such as the time length of the period in which continuous packet losses are expected, the loss occurrence frequency and others.

Interleave length calculator 204, based on the information collected by packet continuous loss information collector 203, determines the interleave length for the interleaving process in packet transmission/reception order permuter 202.

In more detail, interleave length calculator 204 calculates an interleave length that a continuous loss of packets comparable to the time length of the section in which a burst loss takes place at a high possibility will be recognized as single losses (random losses) as a result of the interleaving process. In this process, interleave length calculator 204 may also determine whether or not the reproduction delay occurring as a result of the calculated interleave length will affect reproduction quality and may notify the determined result to the application by way of application data transmitter/receiver 201.

Now, packet loss in a network will be described. Packets are sent out onto a network pass through network devices such as routers and the like when they are transmitted through the network to reach the destination. The following description will be made assuming that network devices are a router. A router determines the route of a packet to be transmitted, based on the destination information written in the packet and forwards it. In this process, in order to handle the packets that arrive one after another, the router forwards the arriving packets while temporarily storing them in a memory called buffer. Since the buffer is a limited resource, if the amount of packets flowing into it exceeds the processable amount of packets, the amount of packets in the buffer increases, causing a buffer overflow. The packets that have overflowed from the buffer are discarded immediately. This buffer overflow is considered to be the principal cause of packet loss.

Figure 5:
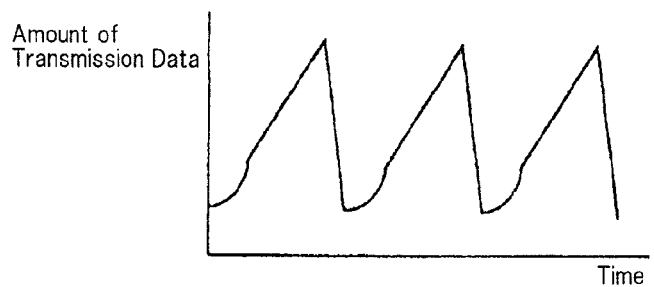
[FIG. 5] is a graph showing the time-dependent change in the amount of transmitted data.

Most of network traffic consists of TCP (Transport Control Protocol) packets. In TCP, a control scheme called window control is used to deal with network congestion. FIG. 5 shows time-dependent change in the amount of transmission data. As shown in FIG. 5, the window control has a traffic characteristic that increases the data rate until a packet loss takes place and reduces the data rate once packet loss has occurred.

Figure 6A:
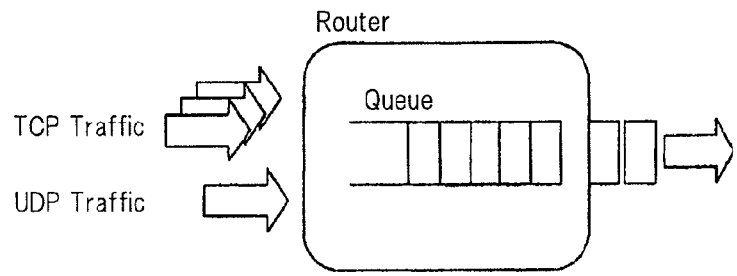
[FIG. 6A] is a schematic diagram showing queue control in a network device.
Figure 6B:
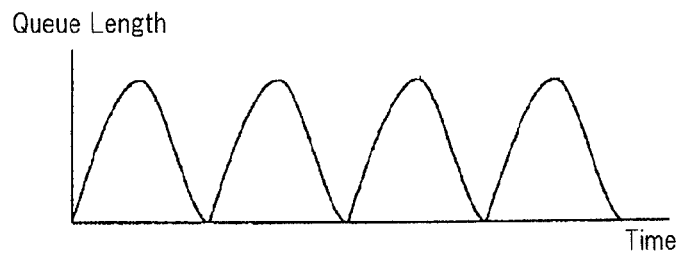
[FIG. 6B] is a graph showing how the queue length changes in a network device.

Now, change of the queue length in the router in a network of which most traffics are occupied by TCP packets having the above characteristic will be considered. FIG. 6A is a schematic diagram showing queue control in a network device. FIG. 6B is a graph showing how the queue length changes in the network device.

Herein, as shown in FIG. 6B a change of one queue length will be considered for simplification. Since the data amount of each TCP traffic increases until a packet loss takes place and becomes reduced reduces when packet loss due to buffer overflow occurs, it is considered that the queue length of a queue including individual traffic changes as in the graph shown in the same figure. Since packet loss takes place when the extension of the queue length reaches the limit, it is possible to estimate from the queue length the sections in which there is a high possibility of a packet loss taking place. If the interleave length is long enough to deal with a continuous loss of packets in the section where there is a high possibility of a packet loss taking place, it is possible to suppress the influence from the continuous packet loss. In the first exemplary embodiment, the interleave length is calculated using this feature.

Figure 7:
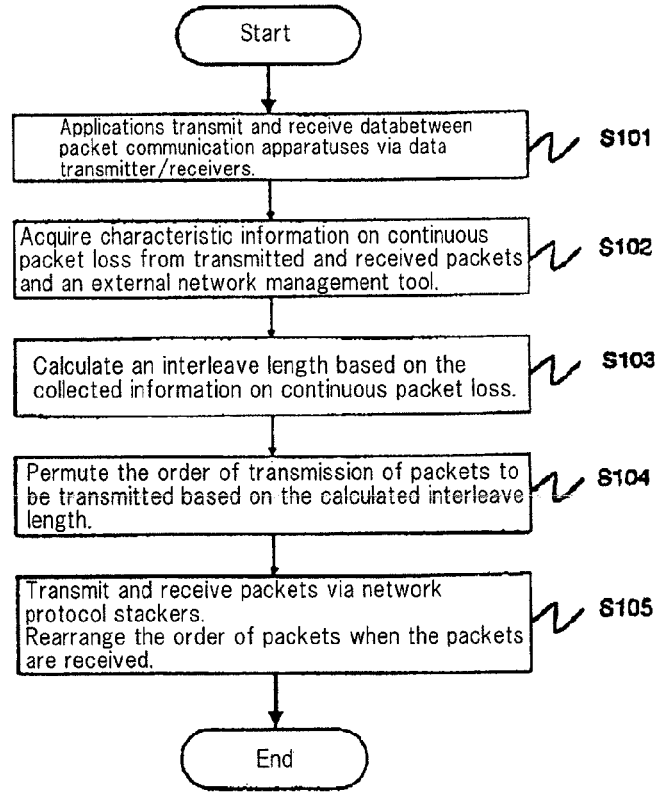
[FIG. 7] is a flow chart showing an operational sequence of a communication system.

FIG. 7 is an operational sequence of communication system 100. Transmission side application 112 and reception side application 122 exchange information relating to the application, video data and audio data between application data transmitter/receivers 201 (FIG. 4) of packet communication apparatuses 111 and 121 (Step S101). Packet continuous loss information collector 203 collects characteristic information on the time length of occurrence and periodicity of continuous packet losses, from the data transmission/reception status of data that are transmitted and received between transmission side terminal 110 and reception side terminal 120, or from information collected by an external network tool (Step S102).

Interleave length calculator 204, based on the characteristic information on continuous packet loss, collected at Step S102, calculates an interleave length that a continuous loss of packets comparable to the time length of the section in which a burst loss takes place at a high possibility will be recognized just as random losses (Step S103). In calculation of the interleave length, interleave length calculator 204 can calculate the reproduction delay that will occur when the calculated interleave length is used, evaluate the influence of the reproduction delay on reproduction quality, and give notice to the application side by way of application data transmitter/receiver 201 if it determines that there will be some influence on reproduction quality. The calculation of the interleave length executed in the process from Steps S101 to S103 may either be carried out only once when the application is started or may be done periodically. It is also possible to make a calculation at any timing to deal with the varying network status.

Packet transmission/reception order permuter 202 permutes the order of transmission of packets to be transmitted based on the interleave length calculated at Step S103 (Step S104). Transmission side terminal 110 sends out the packets whose order of transmission has been permuted to network 130 via network protocol stacker 205 (Step S105). When receiving data via network 130, network protocol stacker 205 in reception side terminal 120 transfers the received data to packet transmission/reception order permuter 202. Packet transmission/reception order permuter 202 restores the order of data whose order of transmission has been permuted, into the original order and transfers the data to reception side application 122 via application data transmitter/receiver 201.

In the exemplary embodiment, continuous packet loss information collector 203 collects information on continuous packet loss, and interleave length calculator 204 calculates the interleave length based on that information. Determination of the interleave length in accordance with the characteristic of the periods of continuous packet losses occurring on network 130 and permutation of the order of transmission of packets by packet transmission/reception order permuter 202 based on that interleave length make it possible to make the receiving side recognize a continuous packet loss as single-packet losses. Accordingly, in the present exemplary embodiment, it is possible to prevent an application that demands real-time performance from being deteriorated by continuous packet loss.

Figure 8:
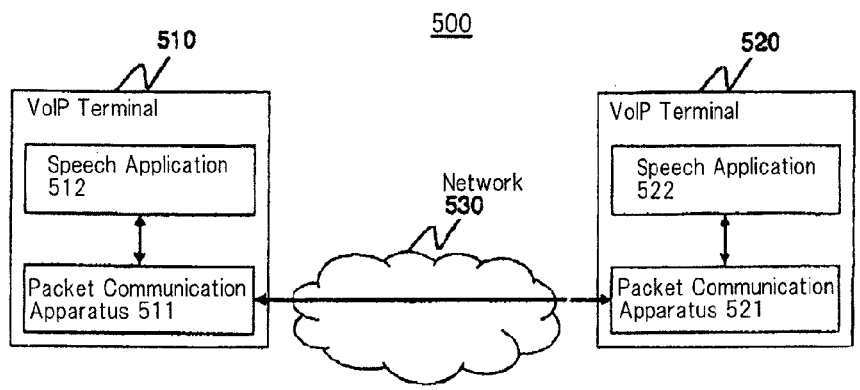
[FIG. 8] is a block diagram showing a configuration of a communication system of the first example.

Next, the present exemplary embodiment will be described taking a specific example. FIG. 8 shows a configuration of a communication system of the first example. This communication system 500 is a VoIP system including VoIP (Voice over Internet Protocol) terminals 510 and 520 to mutually exchange audio data in real-time. VoIP terminals 510 and 520 correspond to transmission side terminal 110 and reception side terminal 120 in FIG. 3. VoIP terminals 510 and 520 transmit and receive voice by using RTP (Real-Time Transport Protocol) as the data transfer protocol generally used for real-time applications and by using RTCP (TRP Control Protocol) as its control protocol. It is assumed that other services other than VoIP are also implemented on network 530 and the status of the network is continuously changing.

Packet communication apparatuses 511 and 521 collect information as to the periods in which continuous-packet losses take place by means of continuous packet loss information collector 203 (FIG. 4). Several techniques can be considered to collect information as to the periods in which continuous packet losses take place.

For example, the behavior of the audio packets being currently transmitted and received by VoP terminals 510 and 520 is observed so that the periods in which continuous-packet losses take place may be estimated based on that behavior. In this case, since the queue length cannot be directly observed from the behavior of audio packets, the queue length is estimated based on packet delay. The delay is a numeric value given as the sum of the time required for queuing and the network transmission time. Since the network transmission time is constant, a change of the time for queuing can be regarded as a change of the delay. Packet communication apparatuses 511 and 521 collect information as to the change of delay time and status of occurrence of single or continuous packet losses based on the conditions of packet transmission and reception, and identify the time periods in which continuous packet losses take place.

As the second technique for collecting information as to continuous packet loss, there is a method of acquiring the queue length and information on packet loss from the network device, using a network management protocol such as SNMP (Simple Network Management Protocol).

The techniques for collecting information as to continuous packet loss should not be limited to the above two, but other methods can be used. Interleave length calculator 204 (FIG. 4), based on the information collected by continuous packet loss information collector 203, estimates the periods in which continuous-packet loss is likely to occur and calculates the interleave length based on the estimated period.

Figure 9:
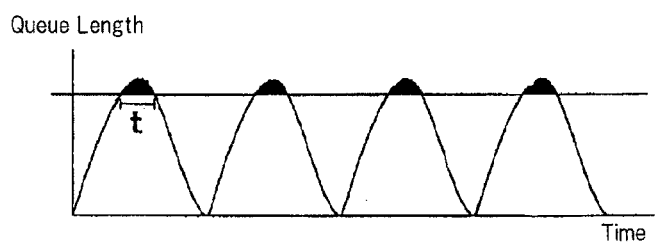
[FIG. 9] is a graph showing how the queue length changes and periods in which continuous packet losses are expected.

FIG. 9 shows how the queue length changes with time. It is assumed, for example that continuous packet loss information collector 203 has collected information as to the queue length that varies as in the graph shown in the same figure. It is considered that the range around each peak of the queue length in this graph corresponds to the period in which continuous packet loss is prone to occur. Interleave length calculator 204, based on the information on the occurrence cycle and occurrence frequency (occurrence probability) of continuous packet losses, collected by continuous packet loss information collector 203 and the queue length information, estimates the threshold of the queue length to determine the periods in which a continuous loss of packets is expected to occur, and assumes that time "t" (period indicated by black solid) in which the queue length exceeds the estimated threshold, is the period in which a continuous packet loss is likely to occur.

In the interleaving scheme, in order to suppress influence from continuous packet loss, the interleave length may and should be set so as to be longer than the period in which continuous packet loss is likely to occur. Interleave length calculator 204 sets the interleave length to be longer than time "t" during which continuous packet loss is likely to occur, determined as above.

For example, a case where time "t" in which continuous packet loss is likely to occur is 100 msec., will be considered. If the transmission interval between audio packets is 20 msec., interleave length calculator 204 may and should determine such an interleave length in which five packets will be inserted after permutation between two packets that are adjacent to each other before permutation. Then, if packets for 100 msec. have been continuously lost, none of the packets before permutation will be lost continuously, hence it is possible to suppress the influence from continuous loss after permutation. Calculation of the interleave length may be carried out at the timing of starting execution of the application or may be done at any time in accordance with the result of the observation of network variation.

Interleave length calculator 204 also calculates reproduction delay corresponding to the calculated interleave length. For example, if the interleave length is "5" with a packet transmission interval of 20 msec., the reproduction delay entailed with permutation of the order of transmission of packets is 100 msec.

Also, interleave length calculator 204 determines whether the calculated reproduction delay falls within the permissible range. For example, it is assumed that the network delay occurring in the transmission of packets is 50 msec. and that the reproduction delay entailed by permutation of the transmission order of packets is 100 msec. Further, the application is assumed to permit a delay of up to 200 msec. In this case, the total time (150 msec.) of the reproduction delay entailed by permutation of the transmission order of packets and the network delay required for packet transmission, falls within the delay time (200 msec.) that is permitted by the application. Accordingly, packet transmission/reception order permuter 202 performs permutation of the packet transmission order based on the interleave length as calculated by interleave length calculator 204.

On the other hand, if the delay permissible by the application is 100 msec., use of the interleave length calculated by interleave length calculator 204 cannot keep pace with the reproduction. Accordingly, this interleave length cannot be adopted. In this case, interleave length calculator 204 gives notice to the application side via application data transmitter/receiver 201 that the reproduction delay exceeds the permissible value. Receiving this notice, transmission side application 112 and reception side application 122 may alleviate the permissible delay or may take other measures.

Generally, human perception is insensitive to the deterioration of reproduction signal quality due to packet loss of some degree. Therefore, the data transmitted and received between VoIP terminals 510 and 520 is permitted to have packet loss to a certain extent, and there occurs no problem if some packet loss occurs. However, once continuous-packet loss takes place, voice sound is interrupted, giving rise to serious degradation of reproduction quality. In the present example, even if occurrence of continuous packet loss is expected, execution of interleaving based on the interleave length in accordance with the occurrence of period of continuous losses makes it possible to transform a continuous loss of packets on the network into single packet losses when they are reproduced, whereby it is possible to prevent interruption of voice sound.

Figure 10:
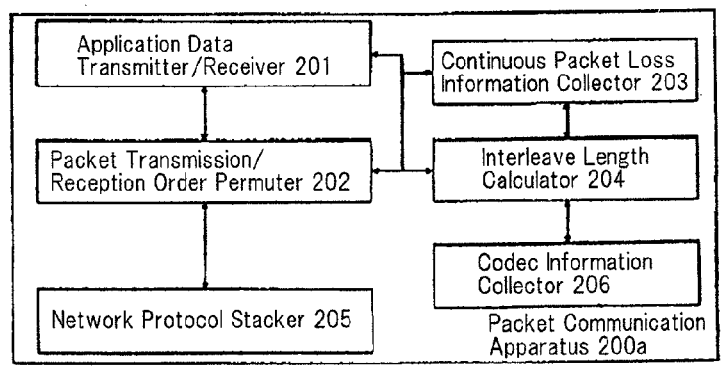
[FIG. 10] is a block diagram showing a configuration of a packet communication apparatus of the second exemplary embodiment.

FIG. 10 is a configuration of a packet communication apparatus of the second exemplary embodiment of the present invention. Packet communication apparatus 200*a* of the present exemplary embodiment is different from packet communication apparatus 200 of the first exemplary embodiment shown in FIG. 4 in that codec information collector 206 is further included. Codec information collector 206 collects and manages information (which will be referred to hereinbelow as "codec information") relating to the quality and performance presented by the codec used in transmission side application 112 and reception side application 122 (FIG. 3). Interleave length calculator 204 calculates the interleave length based on the information (which will be referred to hereinbelow as "continuous packet loss information") collected by continuous packet loss information collector 203 and the codec information collected by codec information collector 206. According to this, the interleave length is set at such a value that even if a group of packets, comparable to the time length of the section in which a burst loss occurs, have been continuously lost, there is a high possibility that the loss can be recognized as single losses when the packets are rearranged into the original order on the reception side. Further interleave length calculator 204 selects a codec suitable for the packet loss ratio due to apparent single packet losses on the reception side.

Figure 11:
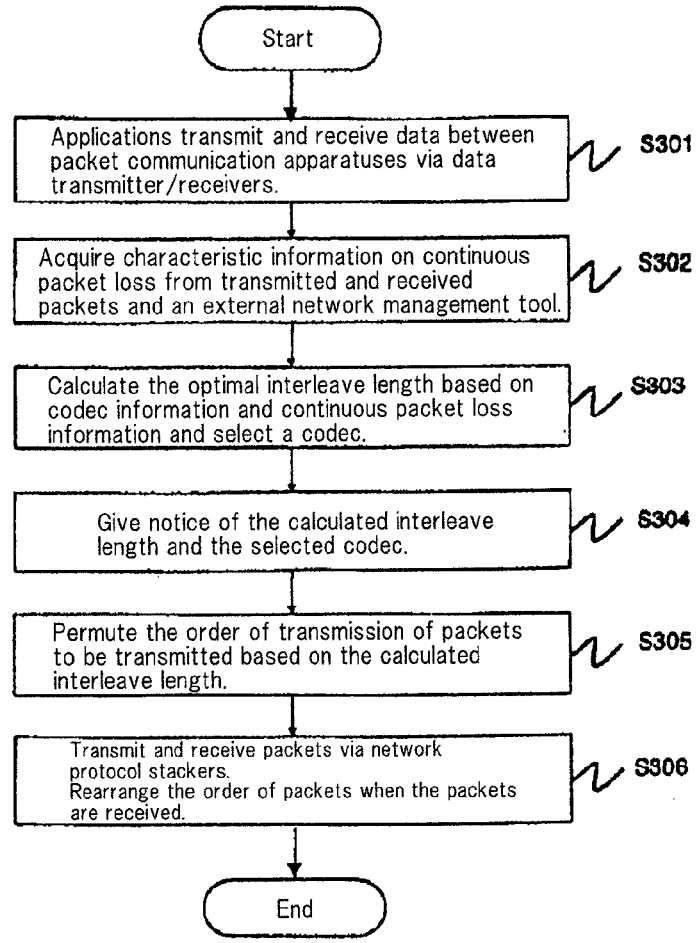
[FIG. 11] is a flow chart showing an operational sequence of a communication system including the packet communication apparatus of FIG. 10.

FIG. 11 is an operational sequence of a communication system including the packet communication apparatus of FIG. 10. Transmission side application 112 and reception side application 122 exchange information relating to the application, for example demanded reproduction quality, codec information and the like, video data and audio data between packet communication apparatuses 200a, which correspond to packet communication apparatus 111 and 121 in FIG. 3, via application data transmitter/receivers 201 (Step S301). Packet continuous loss information collector 203, based on the transmitted and received data, or from an external network management tool, collects continuous packet loss information indicating the periods of occurrence of packet loss and periodicity of continuous-packet loss (Step S302).

Interleave length calculator 204, based on the continuous packet loss information collected at Step S302, calculates an interleave length that a continuous loss of a group of packets comparable to the time length of the section in which a burst loss takes place at a high possibility will be recognized as random losses (single losses) on the reception side. Further, the calculator also calculates the packet loss ratio of the realized apparent random losses and selects a codec capable of presenting higher quality based on the calculated result (Step S303). Interleave length calculator 204, after calculation of the interleave length, calculates the reproduction delay that will occur when transmission is performed using that interleave length, and evaluates the influence of the interleave length on reproduction quality. Interleave length calculator 204, when it determines that the influence on reproduction quality is not permissible, may give notice to the application side by way of application data transmitter/receiver 201.

When determining that the calculated interleave length will not have an impermissible influence on reproduction quality, interleave length calculator 204 notifies packet transmission/reception order permuter 202 of that interleave length and notifies the application by way of application data transmitter/receiver 201 of the selected codec information (Step S304). Packet transmission/reception order permuter 202 permutes the order of transmission of packets based on the interleave length notified by interleave length calculator 204 (Step S305). Transmission side terminal 110 sends out the rearranged packets whose order of transmission has been permuted to network 130 via network protocol stacker 205 (Step S306).

When receiving packets via network 130, network protocol stacker 205 in reception side terminal 120 transfers the received packets to packet transmission/reception order permuter 202. Packet transmission/reception order permuter 202 restores the order of packets whose order of transmission has been permuted to the original order and transfers the packet data to reception side application 122 via application data transmitter/receiver 201.

Similarly to the first exemplary embodiment, in the present exemplary embodiment, determination of the interleave length based on the information on continuous packet loss makes it possible to make a continuous packet loss look like single-packet losses, hence it is possible to prevent quality deterioration due to continuous packet loss. Further, in the present exemplary embodiment, based on the occurrence ratio (packet loss) of apparent single-packet losses that correspond to the calculated interleave length, a codec of presenting high reproduction quality is selected. As a result is possible to enhance reproduction quality.

Next, the present exemplary embodiment will be described taking a specific example. The communication system of the second example of the present invention has the same configuration as the communication system of the first example shown in FIG. 8. Speech applications 512 and 522 encode audio information using a speech codec and decode the encoded audio information. There are various kinds of speech codecs depending on purposes. Specific examples include speech codecs suitable for narrow band networks, speech codecs that can acquire high quality in exchange for use of a broad band.

Figure 12:
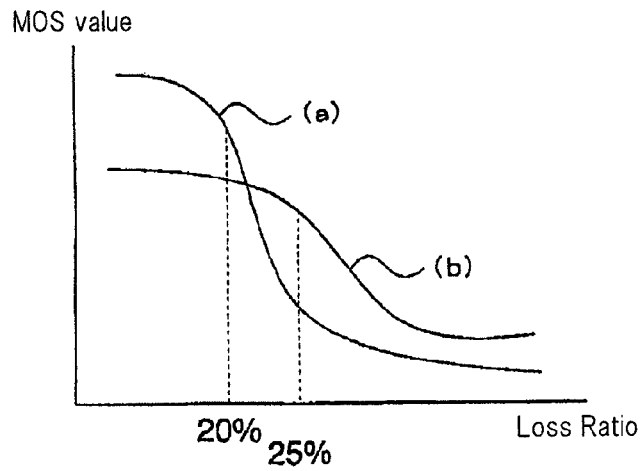
[FIG. 12] is a graph showing the relationship between the packet loss ratio and speech quality.

FIG. 12 shows the relationship between packet loss ratio and speech quality. Speech codecs can be evaluated based on an index shown in FIG. 12. In FIG. 12, for each speech codec, the influence of packet loss on speech quality is evaluated. As an index representing speech quality, the MOS (Mean Opinion Score) value or the R-value is adopted. The MOS value is the mean value of user's evaluations when actual speech is heard and assessed on a scale of one to five by a plurality of users. On the other hand, the R-value is an index that is used to objectively evaluate speech quality. A calculation formula for converting the R-value into the MOS value and the calculation formula for converting the MOS value into the R-value have been proposed. In the present example, a case will be shown in which the MOS value is used.

Generally, the MOS value changes depending on the packet loss ratio; the MOS value tends to become lower as the packet loss ratio becomes higher. Also, the MOS value corresponding to the packet loss ratio usually varies depending on the types of codecs. In FIG. 12, graph (a) shows the MOS value depending on the packet loss ratio for speech codec A and graph (b) shows the MOS value depending on the packet loss ratio for speech codec B. In a comparison between graph (a) and graph (b), when the packet loss ratio is 20%, the MOS value for speech codec A is higher than the MOS value for speech codec B or it can be said that the speech quality of speech codec A is higher than the speech quality of speech codec B. However, when the packet loss ratio is 25%, the MOS value for speech codec A is lower than the MOS value for speech codec B, hence the speech quality of speech codec A becomes lower than the speech quality of speech codec B. The packet loss ratio herein is assumed to be the proportion of packet losses that occur at random.

Figure 13:
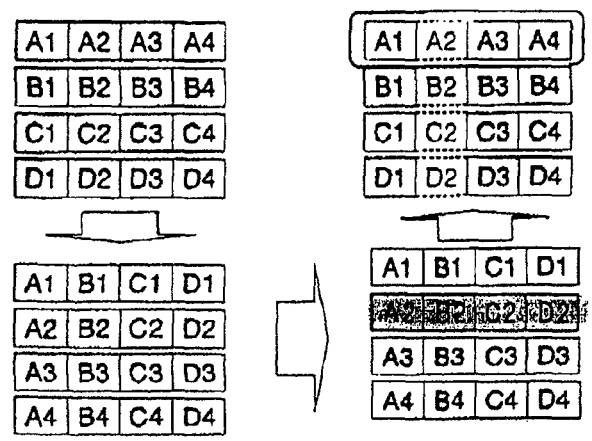
[FIG. 13] is a block diagram showing how the packet loss ratio is calculated when the interleave length is "4".

For example, consider a case where audio codec A is used with speech applications 512 and 522 under a condition in which a packet loss ratio of 20% is expected. Similarly to the first example, interleave length calculator 204 calculates the interleave length based on the time length of time "t" (FIG. 9) in which continuous packet losses are observed at a high occurrence ratio. FIG. 13 shows how the packets are rearranged when the interleave length is "4". The hatching in the drawing shows a continuous loss of data. The data indicated by the broken line represents lost data.

When time "t", in which the occurrence ratio of continuous packet loss is high, has a time length corresponding to four packets, interleave length calculator 204 determines the interleave length to be "4". In this case, for example, as shown in FIG. 13, loss of four continuous packets A2, B2, C2 and D2 is observed as four random losses (single losses) when the order of packets is rearranged into the original order on the reception side. In this case, the packet loss ratio is 1/4=25%.

Referring to graphs (a) and (b) shown in FIG. 12, at a packet loss ratio of 25%, the MOS value for speech codec B is greater than the MOS value for speech codec A. This means that the speech quality in speech codec B is higher than the speech quality in speech codec A. In this case, interleave length calculator 204 determines that speech codec B can present a higher speech quality when the apparent packet loss ratio that is calculated from the time length of the continuous loss period, correspondingly to the interleave length "4" determined based on the time length of the continuous loss period, is "25%". Therefore, interleave length calculator 204 gives notice to speech applications 512 and 522 that speech codec B should be selected. Speech applications 512 and 522 change so that encoding and decoding of audio data will be performed using speech codec B.

In the present example, similarly to the first example, it is possible to prevent the occurrence of interruption of speech by making a continuous packet loss look like single losses. When, based on the characteristics of codecs, a speech codec that can provide the highest speech quality is selected in accordance with the packet loss ratio corresponding to the calculated interleave length so that speech applications 512 and 522 will use the selected codec, it is possible to present high speech quality to users.

Having described the present referring to the preferred exemplary embodiments, the communication apparatus, method and program of the present invention should not be limited to the above-described exemplary embodiments, various modifications and changes from the configurations of these exemplary embodiments should be included within the scope of the present invention.

The invention claimed is:

1. A communication apparatus comprising:
 a packetizer for sectioning data to be transmitted into predetermined units and for packetizing them into packets;
 a permuter for permuting the order of the packets created by said packetizer based on a designated interleave length and sending out the packets to a network;
 a continuous loss information collector for collecting information on continuous packet loss occurring on said network; and
 an interleave length determiner for determining an interleave length based on said information on continuous packet loss, collected by said continuous loss information collector and designating the interleave length for said permuter,
 wherein said interleave length determiner, based on said information on continuous packet loss, determines the time length of the period in which continuous packet loss is expected and determines the interleave length based on the time length of the period in which the continuous packet loss is expected,
 said information on continuous packet loss includes information on the queue length in a network device that relays the packets sent out from said communication apparatus,
 said information on continuous packet loss further includes information on the occurrence status of continuous packet loss in said network, and
 said interleave length determiner, based on said information on the occurrence status of continuous packet loss and information on the queue in said network device, estimates a threshold of the queue length for determining periods in which said continuous packet loss is expected, and determines periods in which said queue length exceeds said threshold to be said periods in which said continuous packet loss is expected,
 said continuous loss information collector estimates the queue length in said network device based on packet delay.

2. The communication apparatus according to claim 1, wherein said interleave length determiner determines the interleave length such that after the packets are permuted, the interval at which two packets that were located adjacent to each other before permutation are transmitted is greater than the time length of the period in which said continuous packet loss is expected.

3. The communication apparatus according to claim 1, wherein said interleave length determiner determines said interleave length to be greater than the value that is obtained by dividing the time length in which said continuous packet loss is expected by the packet transmission time interval.

4. A communication apparatus comprising:
 a packetizer for sectioning data to be transmitted into predetermined units and for packetizing them into packets;
 a permuter for permuting the order of the packets created by said packetizer based on a designated interleave length and sending out the packets to a network;
 a continuous loss information collector for collecting information on continuous packet loss occurring on said network; and
 an interleave length determiner for determining an interleave length based on said information on continuous packet loss, collected by said continuous loss information collector and designating the interleave length for said permuter,
 wherein said information on continuous packet loss includes information on the queue length in a network device that relays the packets sent out from said communication apparatus,
 a plurality of codecs having different reproduction quality characteristics depending on network quality are given as the codecs available to create said data to be transmitted, and
 said interleave length determiner, based on said determined interleave length and said characteristic for each of said codecs, determines the codec to be used for creating said data to be transmitted,
 said continuous loss information collector estimates the queue length in said network device based on packet delay.

5. The communication apparatus according to claim 4, wherein said characteristic shows the correspondence relationship between the packet loss ratio in said network and the reproduction quality,
 said interleave length determiner calculates the packet loss ratio expected when packets are permuted based on said determined interleave length, and determines the codec that maximizes the reproduction quality when the packets are lost at the packet loss ratio, as the codec to be used to create said data to be transmitted.

6. A communication method for sending out data to a network after sectioning the data to be transmitted into predetermined units and packetizing them into packets and permuting the order of the packets, comprising:

collecting information on continuous packet loss occurring on said network, said information on continuous packet loss including information on the queue length in a network device that relays the packets; and determining said interleave length based on said collected information on continuous packet loss, wherein a plurality of codecs having different reproduction quality characteristics depending on network quality are given as the codecs available to create said data to be transmitted, and, the codec to be used for creating said data to be transmitted is determined based on said determined interleave length and said characteristic for each of said codecs, the queue length in said network device is estimated based on packet delay.

7. A non-transitory computer-readable medium containing a program for causing a computer to execute:

a procedure of collecting information on continuous packet loss occurring on a network, said information on continuous packet loss including information on the queue length in a network device that relays the packets;

a procedure of determining an interleave length based on said collected information on continuous packet loss;

a procedure of sectioning data to be transmitted into predetermined units and packetizing them into packets; and, a procedure of permuting the order of the packetized packets based on said interleave length and sending out the packets to the network, wherein a plurality of codecs having different reproduction quality characteristics depending on network quality are given as the codecs available to create said data to be transmitted, and, the codec to be used for creating said data to be transmitted is determined based on said determined interleave length and said characteristic for each of said codecs, and in said procedure of collection information on continuous packet loss occurring on said network, the queue length in said network device is estimated based on packet delay.

* * * * *